US008874328B2

(12) United States Patent
Park et al.

(10) Patent No.: US 8,874,328 B2
(45) Date of Patent: Oct. 28, 2014

(54) METHOD FOR CONTROLLING AUTO IDLE STATE OF HEAVY CONSTRUCTION EQUIPMENT

(75) Inventors: Jun Hong Park, Incheon (KR); Jeong Kwon Jang, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/995,260

(22) PCT Filed: Dec. 21, 2011

(86) PCT No.: PCT/KR2011/009906
§ 371 (c)(1),
(2), (4) Date: Jun. 18, 2013

(87) PCT Pub. No.: WO2012/087011
PCT Pub. Date: Jun. 28, 2012

(65) Prior Publication Data

US 2013/0282242 A1 Oct. 24, 2013

(30) Foreign Application Priority Data

Dec. 21, 2010 (KR) ........................ 10-2010-0131127

(51) Int. Cl.

| | |
|---|---|
| ***G06F 7/70*** | (2006.01) |
| ***G06F 19/00*** | (2011.01) |
| ***G06G 7/00*** | (2006.01) |
| ***G06G 7/76*** | (2006.01) |
| ***E02F 9/20*** | (2006.01) |
| ***F02D 41/08*** | (2006.01) |
| ***F02D 29/02*** | (2006.01) |

(52) U.S. Cl.
CPC .............. *E02F 9/2025* (2013.01); *F02D 41/08* (2013.01); *F02D 2200/501* (2013.01); *F02D 29/02* (2013.01)
USPC .................................... 701/50; 701/1; 701/99

(58) Field of Classification Search
USPC ........................................... 701/1, 36, 50, 99
See application file for complete search history.

(56) References Cited

U.S. PATENT DOCUMENTS

2013/0317728 A1* 11/2013 Hall et al. .................... 701/113

FOREIGN PATENT DOCUMENTS

| | | |
|---|---|---|
| KR | 10-0126450 B1 | 12/1997 |
| KR | 10-1999-0088595 A | 12/1999 |
| KR | 10-2006-0096545 A | 9/2006 |
| KR | 10-2010-0075339 A | 7/2010 |

OTHER PUBLICATIONS

Search Report dated Jul. 2, 2012 and written in Korean with English translation attached for International Patent Application No. PCT/KR2011/009906 filed Dec. 21, 2011, 5 pages.

* cited by examiner

*Primary Examiner* — Rami Khatib
(74) *Attorney, Agent, or Firm* — John D. Veldhuis-Kroeze; Westman, Champlin & Koehler, P.A.

(57) ABSTRACT

A method for controlling an auto idle state of heavy construction equipment of an exemplary embodiment of the present disclosure includes: storing, by a vehicle controller (VCU) that receives engine actuation information from an engine controller (ECU), an average traveling value of a worker-set engine RPM for a first set time when the heavy construction equipment is actuated at the worker-set engine RPM; and actuating, by the engine controller (ECU) that receives information on the average traveling value of the worker-set engine RPM for the first set time from the vehicle controller (VCU), an engine at a variable auto idle engine RPM, which varies depending on the average traveling value of the worker-set engine RPM for the first set time, when work is temporarily stopped and the worker-set engine RPM is switched to an auto idle engine RPM.

5 Claims, 2 Drawing Sheets

METHOD FOR CONTROLLING AUTO IDLE STATE OF HEAVY CONSTRUCTION EQUIPMENT

CROSS-REFERENCE TO RELATED APPLICATION

This Application is a Section 371 National Stage Application of International Application No. PCT/KR2011/009906, filed Dec. 21, 2011 and published, not in English, as WO2012/087011 on Jun. 28, 2012.

FIELD OF THE DISCLOSURE

An exemplary embodiment of the present disclosure relates to heavy construction equipment, and more particularly, to a method for controlling an auto idle state of heavy construction equipment that can enhance convenience for a worker, and increase workability and productivity by allowing an auto idle engine RPM of an engine RPM, which is decreased when a work stoppage is continued for a predetermined time, to be variable according to a work situation.

BACKGROUND OF THE DISCLOSURE

In general, heavy construction equipment including an excavator performs various types of work at a worker-set engine RPM (for example, 1,800 to 2,500 RPM) within a predetermined range after starting an engine thereof. In addition, when a worker stops the work, the worker-set engine RPM is automatically switched to an auto idle engine RPM (for example, 1,200 RPM) at a lower level than the set engine RPM set by the worker after a predetermined elapses and when a predetermined time additionally elapses in this state, the auto idle engine RPM is automatically switched to a low idle engine RPM (for example, 800 RPM) at a lower level than the auto idle engine RPM, thereby improving fuel efficiency.

In order for the worker to perform the work again in a state of the auto idle engine RPM in which the work temporarily stops, the auto idle engine RPM needs to be increased to the worker-set engine RPM (for example, 2,000 RPM).

However, in the related art, since the auto idle engine RPM is fixed to a specific RPM, when a difference between the set engine RPM and the auto idle RPM is large, it takes a lot of time to reach the set engine RPM from the auto idle engine RPM, and as a result, the work is slowly performed, thereby degrading workability and productivity of the heavy construction equipment.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An exemplary embodiment of the present disclosure is contrived in consideration of the aforementioned problems, and an object of an exemplary embodiment of the present disclosure is to provide a method for controlling an auto idle state of heavy construction equipment that can rapidly switch an auto idle engine RPM to a worker-set engine RPM to improve worker convenience and productivity and expect improvement of fuel efficiency.

A method for controlling an auto idle state of heavy construction equipment of an exemplary embodiment of the present disclosure is characterized in that an auto idle engine RPM value is changed depending on an average work engine RPM value per predetermined time of a worker.

That is, the method for controlling an auto idle state of heavy construction equipment of an exemplary embodiment of the present disclosure includes: storing, by a vehicle controller (VCU) that receives engine actuation information from an engine controller (ECU), an average traveling value of a worker-set engine RPM for a first set time when the heavy construction equipment is actuated at the worker-set engine RPM; and calculating a variable auto idle engine RPM changed depending on the average traveling value of the worker-set engine RPM for the first set time and actuating an engine at the variable auto idle engine RPM when work is stopped for a previously set predetermined time.

Moreover, the method for controlling an auto idle state of heavy construction equipment may further includes actuating the engine at a previously set auto idle engine RPM when the work of the heavy construction equipment is further stopped for a previously set second set time after being switched to the variable auto idle engine RPM.

Further, when the variable auto idle engine RPM may be calculated to be lower than the set auto idle engine RPM, the variable auto idle engine RPM is changed to the set auto idle engine RPM.

In addition, the calculating of the average traveling value of the set engine RPM may be performed based on only fluctuations of a set engine RPM set by an operator for the first set time.

Further, the calculating of the average traveling value of the set engine RPM may be performed by providing the variable auto idle engine RPM used for the first set time.

According to a method for controlling an auto idle state of heavy construction equipment of an exemplary embodiment of the present disclosure, since a variable auto idle engine RPM is changed due to a work feature of a worker of the heavy construction equipment, an engine load becomes small while a worker-set engine RPM is switched to the variable auto idle engine RPM, and a return reaction time from the variable auto idle engine RPM to the worker-set engine RPM becomes short when work is performed again, thereby enhancing worker convenience and increasing working efficiency, and the worker-set engine RPM is switched to the variable auto idle engine RPM, which is switched again to a set idle engine RPM at a lower level than the variable auto idle engine RPM, thereby preventing degradation of fuel efficiency.

DESCRIPTION OF MAIN REFERENCE NUMERALS OF DRAWINGS

Figure 1:
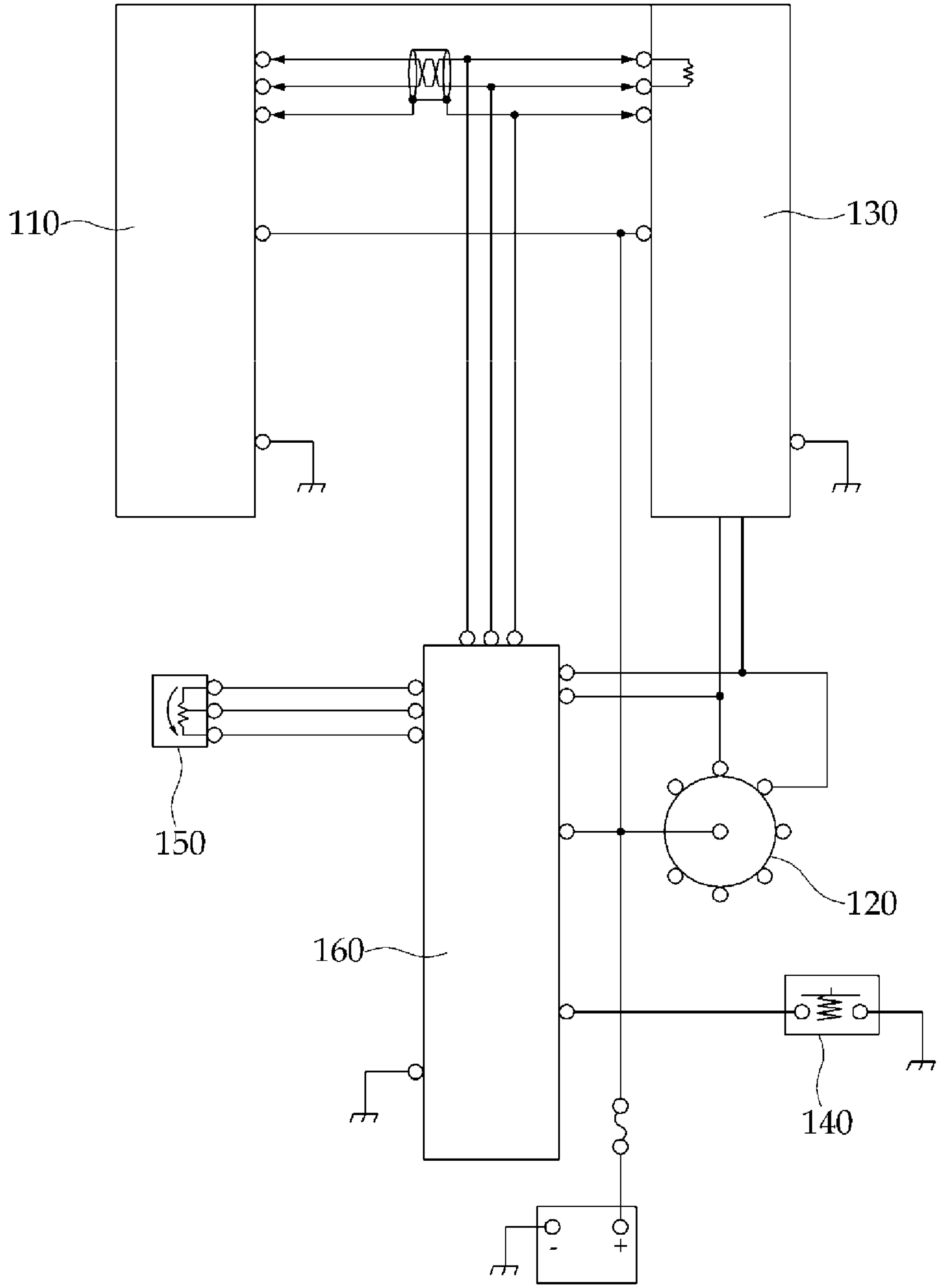
FIG. 1 is a control circuit diagram of an engine RPM of heavy construction equipment according to an exemplary embodiment of the present disclosure.

110: Auto idle input device
120: Key switch

130: Engine controller
140: Auto idle pressure switch
150: Engine control dial
160: Vehicle controller

DETAILED DESCRIPTION

Detailed technological contents of an exemplary embodiment of the present disclosure for achieving the object will be described below in detail with reference to the accompanying drawings.

FIG. 1 illustrates a control circuit diagram of an engine RPM of heavy construction equipment according to an exemplary embodiment of the present disclosure.

As illustrated in FIG. 1, an engine RPM control circuit of the heaving construction equipment is configured in such a manner that an auto idle input device 110 and a key switch (start switch) 120 of a driver seat, which enable setting an auto idle engine RPM, are connected to an engine controller (ECU) 130 controlling an engine RPM, and an auto idle pressure switch 140 and an engine control dial 150 of a driver's seat are connected to the engine controller 130 through a vehicle controller (VCU) 160.

In the engine RPM control circuit of the heavy construction equipment, the vehicle controller 160 transmits an RPM switching signal to the engine controller 130, and the engine controller 130, which receives the RPM switching signal from the vehicle controller 160, automatically switches a set engine RPM set by a worker to an auto idle engine RPM (for example, 1,200 RPM), automatically switches the auto idle engine RPM to a low idle engine RPM (for example, 800 RPM), or automatically switches the auto idle engine RPM or the low idle engine RPM to the set engine RPM.

Herein, the auto idle engine RPM is used by being again divided into a set auto idle engine RPM which is previously set and a variable auto idle engine RPM which varies depending on a working situation. The set auto idle engine RPM may be a value which an equipment manufacturer sets at the time of manufacturing the heavy construction equipment and a value which an operator sets while operating the equipment. Meanwhile, according to another exemplary embodiment of the present disclosure, as the set auto idle engine RPM, the low idle engine RPM described in the related art may be used. Further, according to another exemplary embodiment of the present disclosure, an engine may be driven sequentially at the set engine RPM, the variable auto idle engine RPM, the set auto idle engine RPM, and the low idle engine RPM.

Figure 2:
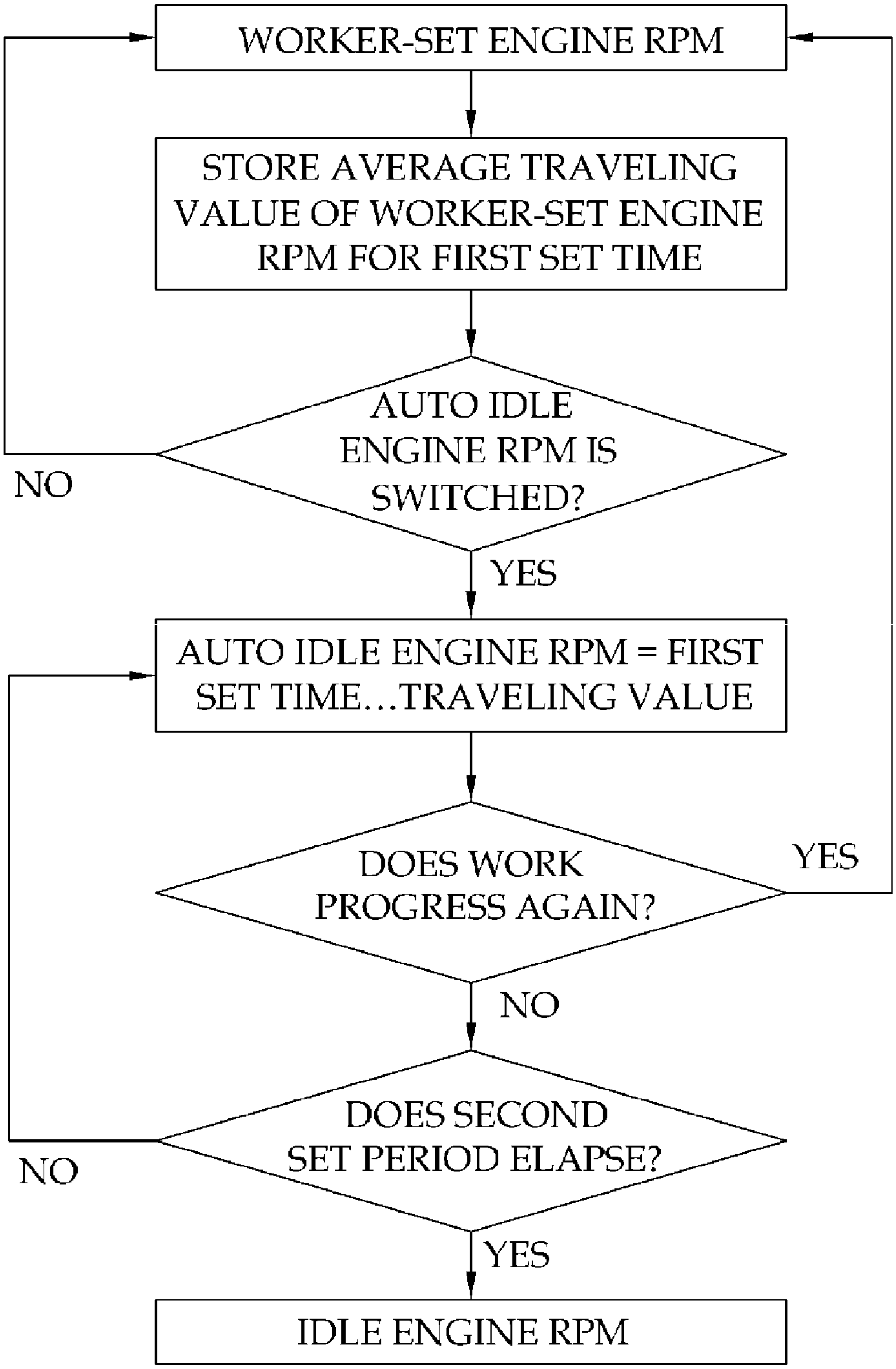
FIG. 2 is a control flowchart illustrating a method for controlling an auto idle state of heavy construction equipment according to an exemplary embodiment of the present disclosure.

Hereinafter, an engine control according to an exemplary embodiment of the present disclosure will be described with reference to FIG. 2.

The vehicle controller 160 controls the engine controller 130 so that the engine is driven at the set engine RPM set by the operator. The aforementioned set engine RPM may be changed by selection by the operator, for example, manipulation of the engine control dial 150 while working. The vehicle controller 160 continuously monitors fluctuations of the set engine RPM set by the worker while controlling the engine to be driven at the changed set engine RPM by reflecting the changed set engine RPM whenever the set engine RPM is changed. That is, an average traveling value of the set engine RPM is calculated and stored for a first time previously set based on the present point, and an average traveling value of the set engine RPM changed as time elapses is updated. The set engine average traveling value may be calculated considering that the engine is driven at the variable auto idle engine RPM, the set auto idle engine RPM, and the like, which will be described below, as the equipment stops working. When such a situation is considered, the variable auto idle engine RPM is calculated to be low, thereby achieving a fuel efficiency effect, and when such a situation is not considered, the variable auto idle engine RPM rapidly returns to the set auto idle engine RPM, thereby improving workability and productivity. Therefore, whether the variable auto idle engine RPM, the set auto idle engine RPM, and the low idle engine RPM are reflected on the set engine RPM average traveling value may be appropriately considered in response to a driver's tendency, a workplace situation, and the like. To this end, a selection switch (not illustrated) may be further provided so as for the operator to select a method for calculating the set engine RPM average traveling value.

Meanwhile, when the work of the heavy construction equipment stops for a predetermined time or more under the aforementioned control, the vehicle controller 160 calculates the variable auto idle engine RPM by using the previously calculated set engine RPM average traveling value. According to the exemplary embodiment, the variable auto idle engine RPM is set to be 80% of the average RPM traveling value. For example, when the average of an RPM which the operator uses for the first time is 2,000 RPM, the variable auto idle engine RPM is set to 1,600 RPM.

As such, when the engine starts to be driven at the variable auto idle engine RPM, the engine monitors whether the work of the heavy construction equipment maintains a stopped state for a second set time again. The second set time may be set by considering an average working pattern of workers of the heavy construction equipment and may be set to, for example, 30 seconds. When the work progresses again, the engine RPM is increased again to the set engine RPM, and when the work of the heavy construction equipment maintains the stopped state for the second set time, the engine RPM is controlled by the set auto idle engine RPM. The set auto idle engine RPM is set to be lower than the variable auto idle engine RPM. For example, the set auto idle engine RPM may be set to 1,200 RPM. If the set engine RPM average traveling value is calculated to be lower than the set auto idle engine RPM, the variable auto idle engine RPM is fixed to the set auto idle engine RPM, and when the variable auto idle engine RPM is recalculated afterwards, the recalculated variable auto idle engine RPM may be reflected. In general, the reason is that the auto idle engine RPM is set in consideration of both workability and fuel efficiency. When the equipment maintains the stopped state for a third time, which is previously set, while the engine is driven at the set auto idle engine RPM, fuel consumption may be minimized by stopping the engine or controlling the engine at the aforementioned low idle engine RPM. Of course, even in this case, when the work of the equipment is started, the engine may be controlled to be driven at the set engine RPM set by the operator. Moreover, the set auto idle engine RPM may be set to a general low idle engine RPM in order to maximize a fuel efficiency effect.

As described above, the engine is driven at the set engine RPM and thereafter, the engine is driven at the variable auto idle engine RPM instead of a set auto idle engine RPM fixed while working is not performed. Accordingly, when the variable auto idle engine RPM returns to the set engine RPM by the start of the work, a load and an impact, which are small, act on the engine and return reaction time also becomes short, thereby enhancing worker convenience and increasing working efficiency.

An exemplary embodiment of the present disclosure described as above is not limited to the foregoing description, and it will be apparent to those skilled in the art that various substitutions, transformations, and changes can be made within the scope without departing from the technical spirit of the preset disclosure.

An exemplary embodiment of the present disclosure can be used in a method for controlling an auto idle state of heavy construction equipment that can rapidly switch an auto idle engine RPM to a worker-set engine RPM to enhance worker convenience and improve workability and productivity.

Although the present disclosure has been described with reference to exemplary and preferred embodiments, workers skilled in the art will recognize that changes may be made in form and detail without departing from the spirit and scope of the disclosure.

The invention claimed is:

1. A method for controlling an auto idle state of heavy construction equipment, comprising:

storing, by a vehicle controller (VCU) that receives engine actuation information from an engine controller (ECU), an average traveling value of a worker-set engine RPM for a first set time when the heavy construction equipment is actuated at the worker-set engine RPM; and calculating a variable auto idle engine RPM changed depending on the average traveling value of the worker-set engine RPM for the first set time and actuating an engine at the variable auto idle engine RPM when work is stopped for a previously set predetermined time.

2. The method for controlling an auto idle state of heavy construction equipment of claim 1, further comprising:

actuating the engine at a previously set auto idle engine RPM when the work of the heavy construction equipment is further stopped for a previously set second set time after being switched to the variable auto idle engine RPM.

3. The method for controlling an auto idle state of heavy construction equipment of claim 2, wherein when the variable auto idle engine RPM is calculated to be lower than the set auto idle engine RPM, the variable auto idle engine RPM is changed to the set auto idle engine RPM.

4. The method for controlling an auto idle state of heavy construction equipment of claim 1, wherein the calculating of the average traveling value of the set engine RPM is performed based on only fluctuations of a set engine RPM set by an operator for the first set time.

5. The method for controlling an auto idle state of heavy construction equipment of claim 1, wherein the calculating of the average traveling value of the set engine RPM is performed by providing the variable auto idle engine RPM used for the first set time.

* * * * *